Oct. 15, 1935.    M. J. ZUCROW    2,017,643
CHARGE FORMING DEVICE
Filed Nov. 20, 1931
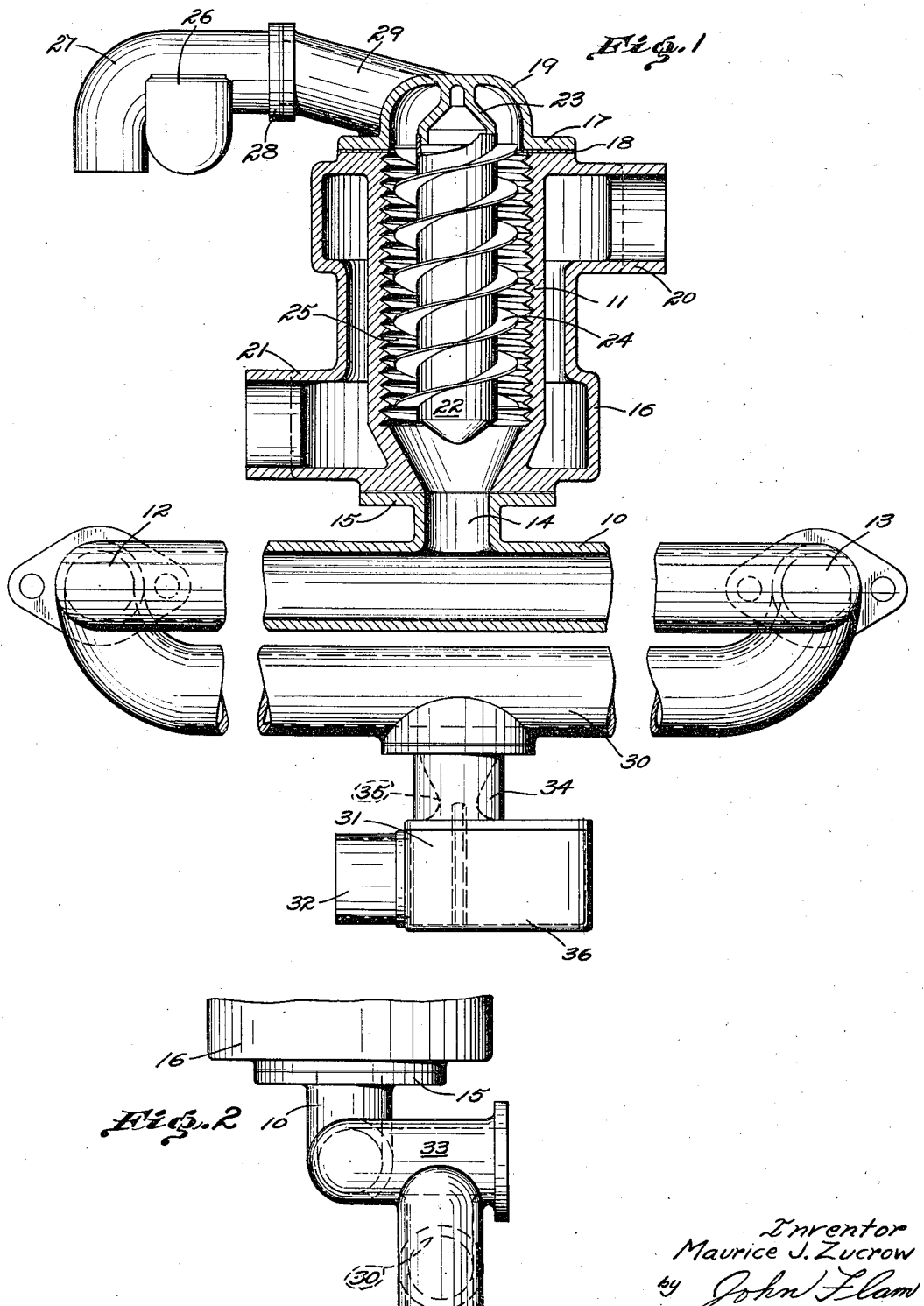
Inventor
Maurice J. Zucrow
by John F. Clam
Attorney Patented Oct. 15, 1935

2,017,643

UNITED STATES PATENT OFFICE 2,017,643

CHARGE-FORMING DEVICE

Maurice Joseph Zucrow, Chicago, Ill.

Application November 20, 1931, Serial No. 576,296

4 Claims. (Cl. 123—25)

This invention relates to a carburetion or fuel supply system which is adapted to prepare liquid hydrocarbon fuels for use in an internal combustion engine, and more particularly to a fuel supply system capable of utilizing the heavy hydrocarbon fuels, that are inexpensive and are usually rated as low grade.

This invention is a continuation in part of my copending application to a Carburetion system, Serial No. 494,083, filed November 7, 1930, now Patent No. 1,985,271.

In my prior application, I described a low-grade fuel system which operates an internal combustion engine with a degree of success comparable to an engine burning gasoline. This is due to the fact that the engine utilizing that system operates at a high efficiency and power output because for a unit volume of cylinder space, the weight of the fuel-air mixture is high; in other words, the volumetric efficiency of the engine is high. Furthermore, the mixture was utilized at temperatures only slightly higher than ordinary atmospheric temperatures, which helped to raise the volumetric efficiency because the fuel mixture density at the low temperatures is high.

In that system, the vaporization or subdivision of the fuel and the diffusion thereof in the air stream is so organized that the pressure or density of the fuel-air mix at the intake port is higher than when vaporizers of the conventional type are used. Thus, due to the combination of comparatively low temperature and of pressure conditions obtained by means of my invention, it is possible to substantially duplicate the operation of an engine burning gasoline. Obviously, this is of prime commercial importance, because the cost of such low-grade fuels is only a fraction of that gasoline.

In addition, the system utilized a vaporizer of low-grade fuels that works so effectively that a substantially uniformly diffused fuel-air mixture is obtained prior to its distribution to the intake ports of the engine. Thus there is an assurance that the engine will operate smoothly, since all of the cylinders thereof will obtain uniform fuel-air charges.

As set forth in my above mentioned application, these results are accomplished by providing a heated conduit to which the liquid fuel is passed, which is placed above and directed downwardly to the distributing manifold, in conjunction with the plastering of the fuel by the air stream to be mixed therewith, onto the walls of the conduit. In this manner the fuel is placed into most intimate heat exchange relationship with the conduit, ensuring the particles of fuel, not effectively utilizable by the engine, will be vaporized and diffused throughout the air stream to form the desired mix.

In this way, no intense heating of the air stream is required; and due to the downward and straight flow of the mixture, moderate air stream velocities can be used, with an attendant moderately reduced pressure in the intake manifold. In some instances the temperature of the fuel-air mixture can be reduced so as further to increase the efficiency and power output of the engine, as by the provision of a supplemental cooler air stream joining the main air stream after the fuel is entrained therein. The cooling however is not carried to such a degree as to permit any condensation of the fuel particles out of the fuel-air stream and onto the walls of the manifold.

I have found that the efficiency of the above described system can be greatly increased by providing a novel means for equally distributing the explosive charge to the several cylinders of the engine and so to control the final temperature of the fuel-air charge that a materially lower temperature fuel-air mixture can be utilized in the engine without danger of fuel depositing or condensing in the manifold.

I accomplish this by mixing a part of the requisite air, and all of the requisite fuel in a conventional carburetor and feeding this over-rich mixture to a means for vaporizing or subdividing the fuel, to form an over-rich dry vapor mixture. As the density of this mixture is greater than if all of the requisite air were included in the mix, the velocity of the mixture is consequently lower. This results in consequent lower pressure losses, and is conducive to higher power output.

The dry over-rich fuel-air mixture flows through the intake manifold to the intake ports of the engine. The remaining cold part of the requisite combustion air is introduced into the intake manifold to mix with the over-rich dry gas mixture, substantially at the intake port of the engine or as close thereto as possible. In this manner, the temperature of the final mixture is lowered to the desired point without any danger of precipitating any of the vaporized fuel by condensation. This is due to the short time interval elapsing between the mixing of the dry fuel-air mixture and the cold air, and the immediate induction of the final mixture into the engine cylinders.

It is therefore an object of my invention so to prepare the fuel-air mixture that equal distribution of the explosive charge to the several cylinders of a multi-cylinder engine is obtained.

It is a further object of my invention so to prepare the fuel-air mixture that the rate of flow thereof in the intake manifold is lower than in the systems of the prior art. This low rate of flow is conducive to a high power output and results in consequent low pressure losses.

It is a further object of my invention to provide a novel means for so controlling the final temperature of the fuel-air charge that a comparatively lower temperature fuel-air mixture can be utilized in the engine, when desirable, without the danger of the vaporized fuel precipitating in the manifold by condensation.

It is a further object of my invention to provide a device simple in design and construction and relatively inexpensive in manufacture.

My invention possesses many other advantages, and has other objects which may be made more easily apparent from a consideration of one embodiment of my invention. For this purpose I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing:

Figure 1 is a sectional view, with part in elevation, of a fuel supply system embodying my invention; and Fig. 2 is a detailed side view of the manifolding embodied in my invention.

The intake manifold for the internal combustion engine is shown at 10, shown in this instance as leading to a pair of intake ports 12 and 13, although the number of ports of course depends upon the particular engine utilizing my device. A heated conduit 11 for vaporizing the fuel extends above and leads into the central portion of manifold 10, and forms a downwardly extending passageway communicating with the manifold 10 and forming therewith a mixing chamber 14. Although the particular manner in which this conduit 11 is supported is of no consequence, it is shown in this instance as seated on a concentric flange 15, integral with manifold 10, and secured thereto in any desirable manner. The conduit 11 is made from metal or other good heat conducting material, and is so arranged that its wall can be heated, as by the passage of exhaust gases around it. In the drawing, the conduit 11 is shown in the preferred form as being of the down draft type, but it is to be understood that my invention can embody other forms of conduits or vaporizers, or subdividers of the liquid fuel particles.

The heating of the conduit 11 is accomplished in this instance by means of the jacket structure 16 which surrounds the conduit, and through which exhaust gases pass. This structure 16 is shown as being formed integral with the conduit 11. A cover 17 is provided which is fastened onto the top of structure 16 and over the top of conduit 11, thus closing the conduit 11 at the top. To keep this closure tight, a gasket 18 may be used. The cover 17 has a dome 19 communicating with the top of conduit 11. It thus provides a place through which fuel and air can be passed so as to be drawn into conduit 11 by the pumping action of the engine. The manner of inducting the fuel and air to produce a moving column of fuel air mixture will be hereinafter described.

Before proceeding with a description of the mode of operation of conduit 11 to vaporize the fuel, a description of the exhaust passageways that conduct the hot gases from the exhaust of the engine can be set forth. Thus there is shown an extension 20 leading from the exhaust passages or manifold of the engine and connected to the upper portion of the jacket 16, thereby communicating with the interior of the structure. The outlet to the muffler for the exhaust gases is shown as formed by an extension 21 leading from the lower portion of the structure 16.

It is thus apparent that the conduit 11 can be effectively heated to provide an interior surface to which unvaporized fuel can pass.

The fuel air passage through conduit 11 is preferably made annular in section, as by the provision of a central tube 22 that is closed at the top by the internal ring 23 depending below dome 19. This ring also forms a convenient means for fastening tube 22 in place, which can be effected in any desirable manner.

Matters are arranged in such a way that if a mixture of fuel and air is caused to progress downwardly through the annular space defined by conduit 11 and tube 22, any unusable fuel particles are urged or plastered against the heated inner wall of conduit 11. For this purpose, the air stream is caused to whirl or rotate, so as to set up a centrifugal action and to urge the unvaporized fuel particles outwardly by the force thus generated. Various means for producing this centrifugal action are available; but in this instance there is shown a helicoidal vane 24 disposed around tube 22, which defines a passageway for the air stream which progresses angularly about the axis of conduit 11 as it flows downwardly.

It is of course understood that fuel in liquid form is passed into the air stream that flows down conduit 11 into manifold 10, by any appropriate means; and that due to the whirling action of this stream around vane 24, those particles of fuel not readily usable by the engine are urged or plastered by centrifugal force against the inner wall of conduit 11. After vaporization thereon, the fuel returns to the air stream by diffusion and is finally inducted into the engine in the form of a homogeneous fuel-air mix. To increase the area of the heated conduit surface, this interior surface can be grooved, as indicated at 25.

While the fuel is strongly heated, the air stream from which it is ejected receives considerably less heat.

The introduction of the liquid fuel into the air stream is shown as accomplished by the aid of a conventional carburetor 26 secured adjacent the open end of a short conduit 27. This conduit is fastened, as by flanges 28, to a short downwardly sloping conduit 29, leading into dome 19. Although the carburetor construction is shown to be of the side fuel outlet type, it is to be understood that any other desired carburetor structure can be used.

A portion of the air necessary for complete combustion, and all of the requisite amount of fuel are mixed in the carburetor 26 resulting in an over-rich mixture. This over-rich mixture is compelled to travel in the helical passageway formed by the helicoidal vane 24, the tube 22, and the conduit 11. The consequent helical or whirling motion set up causes the fuel particles pervading the air stream to be passed laterally to the inner surface of the heated conduit 11 whereon they are vaporized. The vaporized fuel diffuses back into the air stream and the over-rich dry vapor mixture so formed then enters the mixing chamber 14.

As hereinabove set forth, the mixing chamber 14 leads into the intake manifold 10. The dry over-rich fuel-air mixture flows through the intake manifold to the intake ports 12 and 13 of the engine. As the density of this mixture is substantially higher than the density of a proper combustive mixture, it flows through the intake manifold 10 at a low rate, with consequent low pressure losses. This is of prime importance, as low gas velocities are conducive to high power output. Moreover, as the mixture is quite dry and warm, there is no precipitation of fuel in the intake manifold due to condensation.

As already set forth, the best results are obtained if the combustible mixture is fed into the intake parts of the engine at low temperatures. However, it is of the utmost importance that no precipitation of the vaporized fuel by condensation be permitted, or otherwise the efficiency of the system is materially lowered.

I can effect this desired lowering of the temperature of the over-rich dry mixture and provide the requisite quantity of oxygen to burn the fuel by means of a supplemental cold air stream which intermixes with the over-rich mixture substantially at the intake ports 12 and 13. This intermixing of the over-rich mixture with the cold air stream causes a decrease in density of the former and also the desired lowering of the temperature thereof.

To accomplish these desired results, I can provide a cold air manifold 30 which connects with the intake manifold 10 at points which are as close to the intake parts of the engine as it is possible to make the connections. This is clearly shown in Fig. 2. Cool air is drawn from the outside through a conventional inlet device 31 which has a passageway or conduit 34 leading into the cold air manifold 30. The air inlet to device 31 is shown at 32. Device 31 can include a throttle or butterfly valve for controlling the flow of air therein, which can be operated simultaneously with the throttle in carburetor 26 in a manner disclosed in my above mentioned copending application.

With my system as above described, it is possible to employ low gas velocities, which is conducive to a high power output, and to use low final mixture temperatures adjacent the engine intake ports, as at 33 (Fig. 2), without any danger of precipitating any of the vaporized fuel by condensation. The time interval elapsing between the mixing of the dry fuel-air mixture and the cold air, and the immediate induction of the final mixture into the engine cylinders is so very short that the final mixture temperature can be very much lower than the normal condensation temperature of the fuel without any precipitation taking place. With this novel arrangement of the manifold structure, or with this principle of mixing the over-rich dry mixture with the balance of the combustive oxygen at a point very close to the intake ports of the engine, very low mixture temperatures, with their attendant high power development and decreased detonation tendency, can be used successfully without any danger of oil dilution and with clean and complete combustion. It is to be understood, however, that the cold air is admitted into the intake ports only when the engine approaches full load as set forth in my copending application to a Fuel conditioning and supply system, Serial No. 576,295, filed November 20, 1931.

Whenever the fuel used causes detonation when the engine carries heavy loads, it is advisable to feed some antidetonating fluid to the engine. It is therefore a part of my invention, in conjunction with the other principles involved, to meter this antidetonating fluid in the device 30. The injection into the cold air stream of a nondetonating fluid such as water can be readily accomplished through conduit 34. Thus a device 35 such as a Venturi jet and float bowl, can be located in this conduit, and can serve to induct the fluid, such as water from a bowl 36, the amount so taken up being proportioned to satisfy the engine requirements.

I claim:

1. A fuel vaporizer for an engine comprising a carburetor for forming an over-rich fuel-air mixture, a heated conduit through which said mixture passes, means in said conduit for whirling the mixture to force unvaporized fuel particles against the inner wall of the conduit, a manifold connected to said conduit and having a plurality of ports communicating with the engine, a second manifold having a plurality of ports communicating with the first named ports at points closely adjacent the engine for passing relatively cold air into the heated mixture and means for injecting water into the cold air conduit.

2. A fuel vaporizer for an internal combustion engine comprising a carburetor for forming an over-rich fuel-air mixture, a conduit through which said mixture passes, a casing surrounding a part of said conduit and connected to the engine exhaust whereby said conduit is heated, means in the conduit for whirling the mixture to force unvaporized fuel particles against the inner wall of the conduit, a manifold connected to said conduit and having a plurality of ports communicating with the engine, a second manifold having a plurality of ports communicating with the first named ports at points closely adjacent the engine for passing relatively cold air into the heated mixture, and means for injecting water into the cold air conduit.

3. A fuel vaporizer for an engine comprising a carburetor for forming an over-rich fuel air mixture, a manifold having a connection to said carburetor for receiving said mixture therefrom and having a plurality of ports communicating with the engine, a cold air manifold having a plurality of ports communicating with said first named ports closely adjacent the engine, and an inlet connection to said cold air manifold, one of said connections discharging upwardly and the other discharging downwardly.

4. A fuel vaporizer for an engine comprising a carburetor for forming an over-rich fuel air mixture, a vaporizer receiving the mixture from the carburetor and discharging downwardly, a manifold connected to said vaporizer and having a plurality of ports connected to the engine, a second manifold having a plurality of ports connected to said first named ports adjacent the engine, and a water injection device discharging upwardly into said second manifold.

MAURICE JOSEPH ZUCROW.